Figure 1:
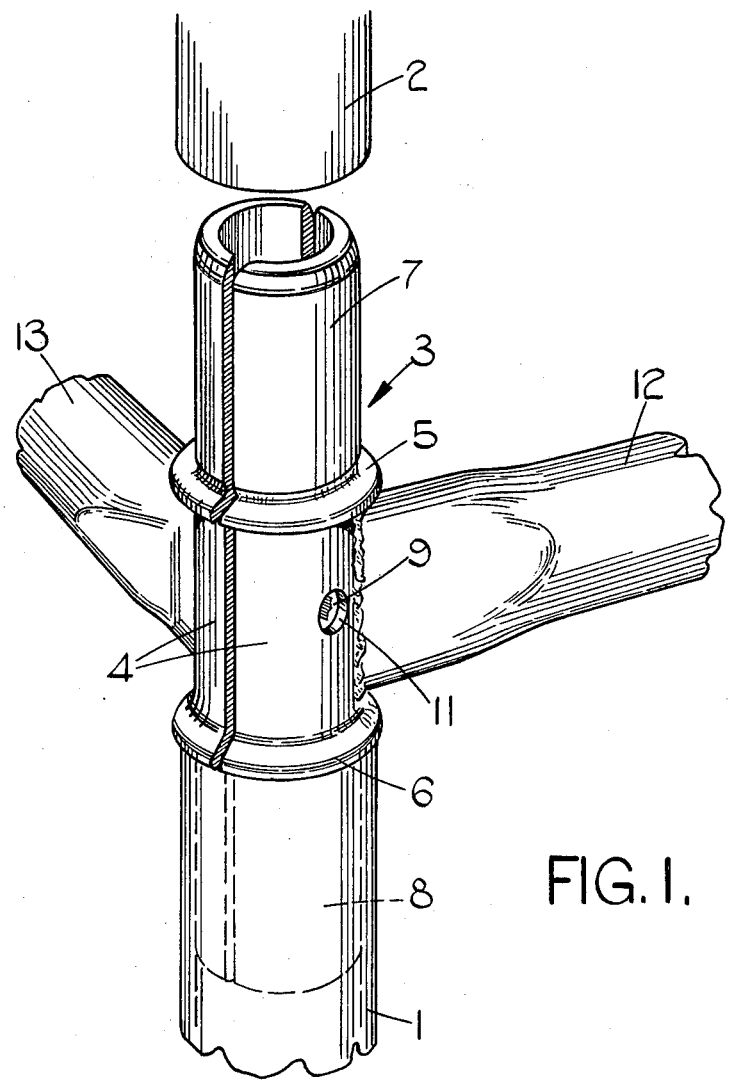

United States Patent [19]

Barton

[11] 4,090,798
[45] May 23, 1978

[54] DEVICE FOR JOINING HOLLOW SECTIONS

[76] Inventor: Peter Barton, 11 Hintlesham Avenue, Edgbaston, Birmingham, England

[21] Appl. No.: 702,567

[22] Filed: Jul. 6, 1976

[30] Foreign Application Priority Data

Aug. 21, 1975 United Kingdom ............... 34716/75

[51] Int. Cl.² ........................................... F16B 21/10
[52] U.S. Cl. .................................... 403/171; 403/176; 403/297; 182/178
[58] Field of Search ............... 403/297, 295, 292, 293, 403/172, 171, 176, 217; 182/178, 179, 175; 285/397

[56] References Cited

U.S. PATENT DOCUMENTS

| 620,834 | 3/1899 | Belcher et al. | 285/397 X |
| 1,678,350 | 7/1928 | Ott | 403/297 X |
| 3,338,602 | 8/1967 | Arnd | 403/297 X |

FOREIGN PATENT DOCUMENTS

| 84,575 | 11/1957 | Denmark | 403/292 |
| 1,061,428 | 11/1953 | France | 403/175 |
| 580,926 | 8/1958 | Italy | 403/175 |
| 421,871 | 1/1935 | United Kingdom | 403/297 |
| 770,335 | 3/1957 | United Kingdom | 403/297 |
| 1,373,571 | 11/1974 | United Kingdom | 403/297 |

*Primary Examiner*—Andrew V. Kundrat
*Attorney, Agent, or Firm*—Ladas, Parry, Von Gehr, Goldsmith & Deschamps

[57] ABSTRACT

The invention is concerned with structures and with means for joining tubes together to form such structures. A connecting means has a pair of component parts each of which has spigot portions extending oppositely from a boss, the portions being such that a complete connecting means has oppositely extending spigots for insertion into respective tubes. Each component has in its boss a locking means for interaction with corresponding means on another component with which it is assembled to provide resistance to withdrawal of the spigots from the tubes.

5 Claims, 2 Drawing Figures

DEVICE FOR JOINING HOLLOW SECTIONS

This invention relates to connecting means for joining together tubular members, as for example of circular cross-section, whereby structures such as scaffolding and other frames of various kinds may be readily assembled from lengths of tube and dismantled when desired. The invention also comprehends component parts for said connecting means.

According to the invention, a component part of connecting means for joining together tubular members comprises a pair of spigot portions extending in opposite directions from a boss and each having a cross-section which is substantially half of that of one of said members so that a pair of components placed face to face form a pair of oppositely extending complete spigots for insertion respectively within said members, the boss carrying, or being adapted to carry locking means arranged to interact with similar locking means on another component in a pair thereof placed face to face to provide resistance to withdrawal of said spigots from said tubular members.

From another aspect of the invention, a structure includes a pair of tubular members interconnected by connecting means comprising a pair of component parts as aforesaid.

Figure 2:
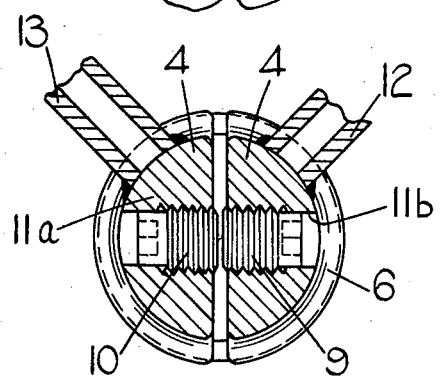

The invention will now be described, by way of example, with reference to the accompanying drawings in which:

FIG. 1 is a perspective view, partially exploded, of part of the structure incorporating the connecting means of the invention, and FIG. 2 is a cross-section along the line 2—2 of FIG. 1.

Referring to the drawings, these show a pair of tubular members 1 and 2 which it is required to join together in axial alignment to form part of a structure such as a scaffolding or other form of frame. The two members are connected together by the connecting means of the invention indicated generally at 3.

Each connecting means 3 includes a pair of similar component parts, each comprising a boss 4 of part-circular solid cross-section having at its ends respective outwardly projecting part-annular shoulders 5 and 6. Beyond each shoulder extends a spigot portion 7, 8 each being of part-annular cross-section of such dimensions that when the two component parts of the connecting means 3 are placed together as shown in FIG. 1, the substantially complete spigots thus formed can be fitted closely within the tubular members 1, 2 respectively to connect these members together.

A locking device is provided to take up the clearance between the outer surfaces of the inserted spigot portions and inner surfaces of the members 1 and 2. The locking device consists of a pair of grub screws 9, 10 screwed into radially extending threaded apertures 11 in the bosses 4. The apertures 11 are tapped from the inside outwardly over only a part 11a of their thickness, leaving untapped portions 11b, and the grub screws are inserted from the inside. It will thus be appreciated that they cannot be screwed out of their respective component parts from the exterior thereof. The apertures and screws are arranged so that when the component parts of the connecting means 3 are disposed in the face to face positions shown in the drawings, the grub screws 9, 10 are diametrically opposed and when screwed inwardly they will react one against the other to force the component parts of the connector 3 outwardly against the inner walls of the tubular members 1 and 2. This provides sufficient frictional resistance between the mating surfaces of the connector and tubular members to prevent relative movement therebetween under normal conditions of use.

To each boss 4 is secured, as by welding, a respective further tubular member 12, 13. These further members are so positioned, that, when the component parts of the connecting member 3 are disposed as shown in the drawing, the further members 12, 13 extend mutually at right angles and also at right angles to the spigots 7 and 8 so that these further members could conveniently form lateral members for example in a rectangular framework in which the members 1 and 2 extend vertically and at least one connecting member 3 is disposed at each corner of the framework.

With the further members connected to the bosses as shown, i.e., with the diametral plane of the bosses at 45°/135° to the axes of the members with the lines of axis of the latter passing through the centre of its respective boss semi-circle, the positions of the further members can be changed so that they are disposed in alignment, by simply rotating one of the component parts through 180° so that the spigot portion 7 becomes the lower portion and vice versa. An aligned configuration of the further members can also be obtained by securing them at right angles to the diametral planes of their respective bosses; this does not permit a change to 90° configuration when required. A further possibility for enabling the further members to be disposed perpendicularly is to secure one of the further members at right angles to the diametral plane of its associated component part and to secure the further member on the mating component part in a position so that it extends parallel to the diametral plane of that part.

In some applications, it may not be necessary to provide two further members at the junction between the members 1 and 2 and in these circumstances it would be possible to provide a component part of the connecting means in which the further tubular member is omitted. Such a component part would otherwise be identical with that shown in the drawings and would thus include a locking means to co-operate with similar locking means on a mating component part as described above.

It is possible to use the connecting means of the invention to provide an alternative construction which can be changed, whilst still assembled, from, for example a rectangular structure to a generally rhomboid structure. Such a structure would have at a first level two opposed sides each formed from a pair of vertical members joined by respective horizontal members connected to their associated vertical members by the connecting means of the invention. Only one component part would be required to have a further member 12, 13 attached thereto to form a horizontal. At a second level, opposed sides would be provided at right angles to the two first sides, using the component parts of the connecting means in a similar manner. It will be appreciated that, with such a construction, with the locking means released, the connecting means can form rotary joints enabling relative movement between the walls of the structure to take place so that the structure can be of generally rectangular or rhomboid shape as desired. With the desired shape of structure established, the locking means can be operated to secure the various members and components in position. This arrangement can be useful when it is desired to use the structure in a confined space since the structure can be adapted to at least some extent to fit the available space and can often be used in spaces into which structures erected by conventional means cannot enter.

It will be appreciated that it would be possible for a boss on a component part to be provided with a plurality of mutually inclined further means, said inclination between the members being in a single plane or in more than one plane.

I claim:

1. A connecting means having a pair of component parts and wherein each component part of the connecting means for joining together tubular members comprises a pair of spigot portions extending in opposite directions from a boss, each spigot having a cross-section which is substantially half of that of one of said members so that a pair of components placed face to face from a pair of oppositely extending complete spigots for insertion respectively within said members, said boss having on its outer periphery part annular radially outwardly extending shoulders at each longitudinal end thereof and being solid and of part cylindrical cross-section, said boss having a screw substantially diametrically disposed therein apt for transverse movement with respect to said boss located such as to engage a similar screw which is diametrically opposed thereon on another component in a pair thereof when placed face to face whereby said screw can be rotated into mutual engagement with said similar screw to urge said pair of components away from one another and thereby provide resistance to withdrawl of said spigots from said tubular members, a further tubular member secured to the surface of said boss, wherein the further tubular member extends in a direction different from the spigot portions.

2. A component part according to claim 1, wherein the spigot portions are of part-tubular cross-section.

3. A component part according to claim 1, wherein the screw is a grub screw arranged in a threaded bore in the boss.

4. A component part according to claim 3, wherein said bore is threaded over only a part of its length in an outward direction, the outermost part of the bore being plain.

5. A component part according to claim 3, wherein said screw of the component is perpendicular to the diametrical plain of the boss and said further member extends from a position circumferentially offset therefrom.

* * * * *